June 11, 1968    J. L. MacFARLANE    3,387,675
AUTOMATIC WEIGHING MACHINE
Filed Nov. 17, 1966    3 Sheets-Sheet 2

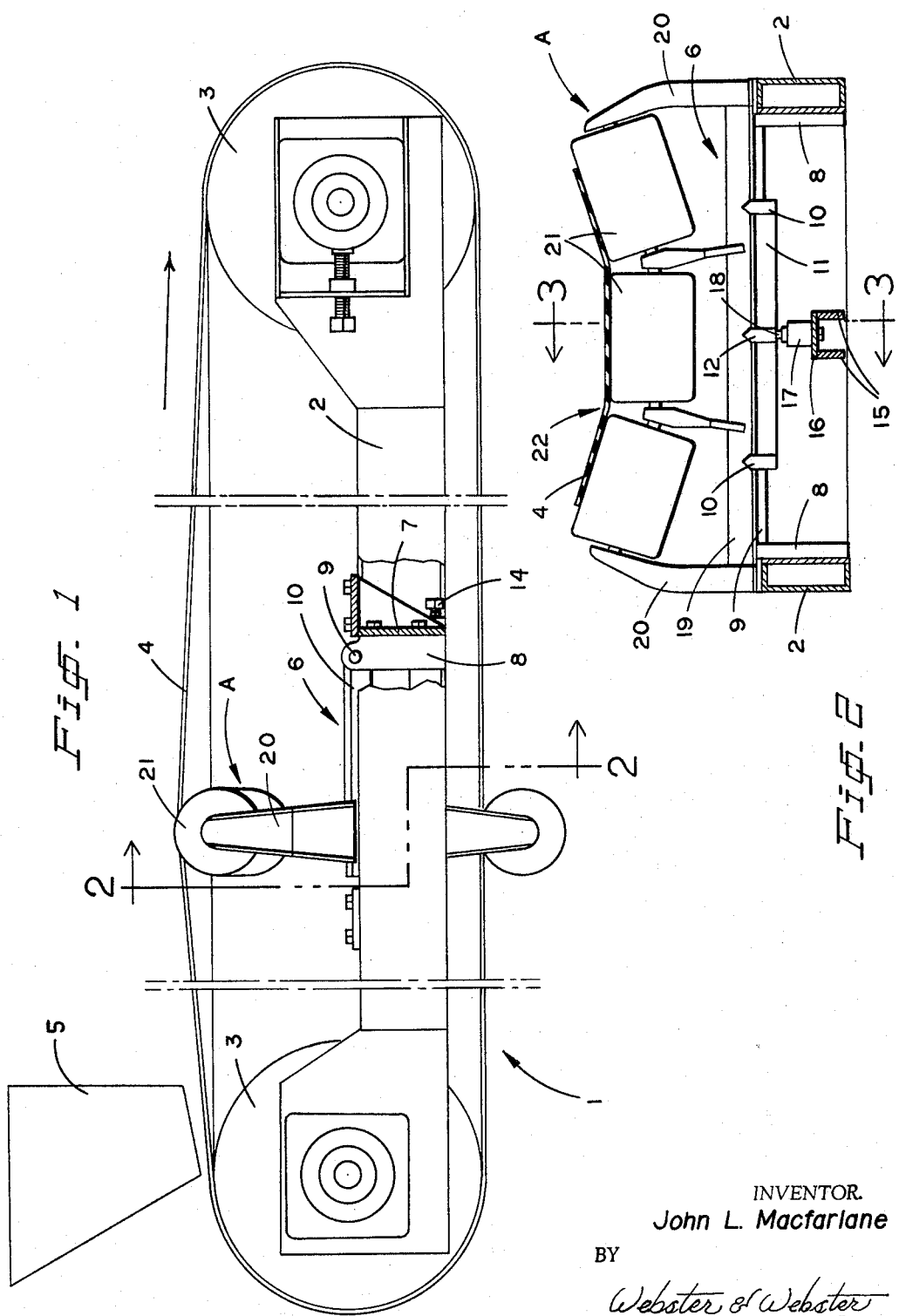

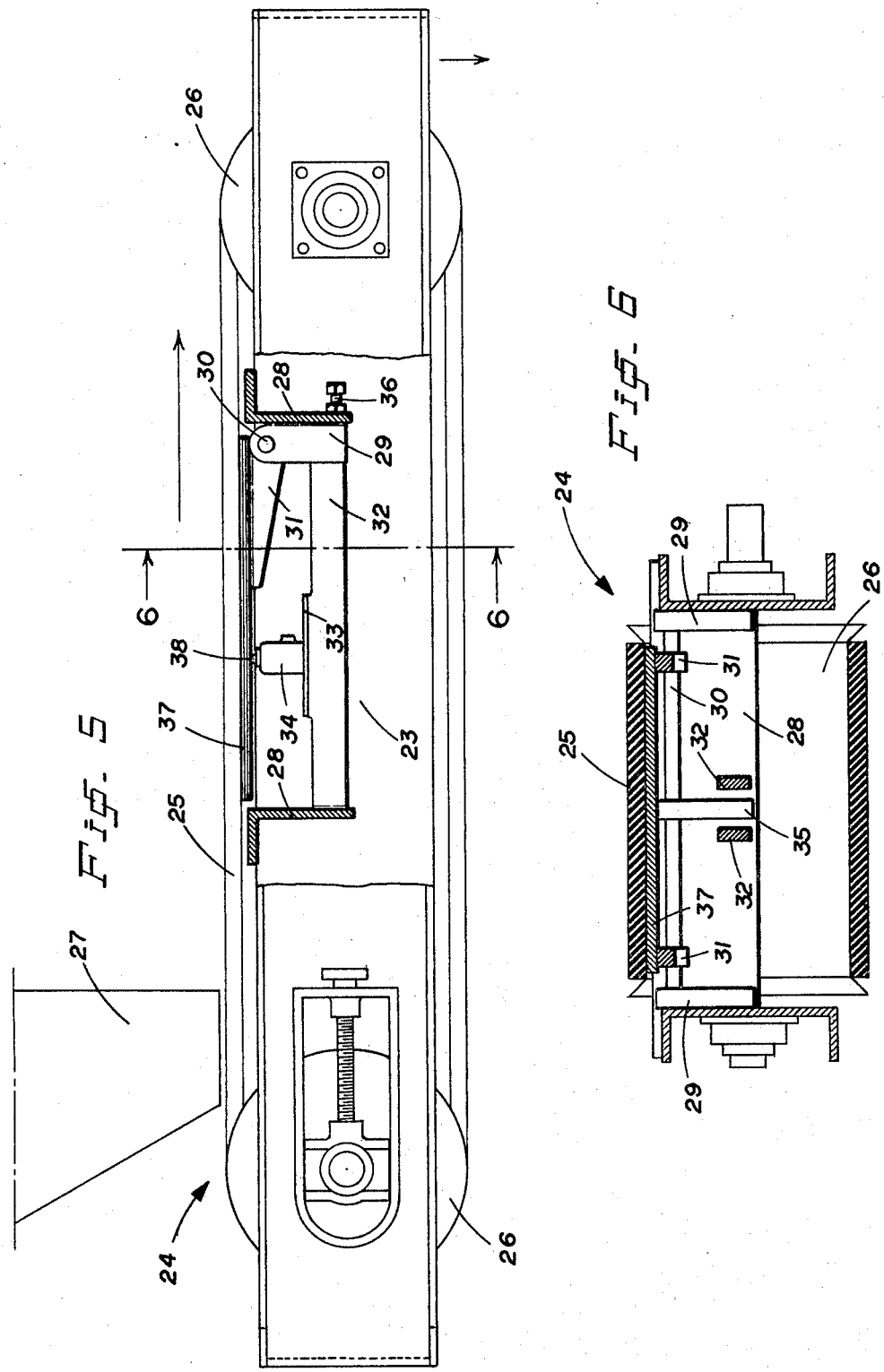

United States Patent Office 3,387,675
Patented June 11, 1968

3,387,675
AUTOMATIC WEIGHING MACHINE
John L. Macfarlane, 1105 W. Roseburg Ave.,
Modesto, Calif. 95350
Filed Nov. 17, 1966, Ser. No. 595,105
9 Claims. (Cl. 177—16)

ABSTRACT OF THE DISCLOSURE

A weighing machine including a load-receiving platform, a torque rod immovably mounted at its ends and rigidly connected to the platform, the rod being torsioned by a load on and the resulting movement of the platform, and a load-registering unit actuated by such movement of the platform.

This invention relates to continuous run, automatic weighing machines of the type used to weigh flowable bulk products; such machines conventionally including—as the load-receiving platform—a driven endless belt.

Background of the invention

Heretofore, various means have been used to provide for accurate weight measurement of the load on the platform of automatic weighing machines as above. Devices for the purpose having included knife-edge fulcrums, flexure plates, a resilient material such as rubber which allows for flexing or bending, and other means. All such devices, however, have one or more shortcomings such as wear, maintenance requirements, inaccurate response, undue sensitivity to shock loads in certain cases, and other defects.

Summary of the invention

It is, therefore, the major object of this invention to provide a continuous run, automatic weighing machine which includes, in cooperative association with the load-receiving platform, a novel weight-responsive unit which is not subject to the above mentioned short-comings; such weight-responsive unit including a torque rod arranged in a manner which provides a finely balanced mount for the platform-engaging structure of said unit. Such mount allows the platform-engaging structure of the weight-responsive unit to float vertically while preventing undesirable longitudinal or lateral movement; the vertical floating movement of said platform-engaging structure, in response to a load on the platform, being translated into an accurate weight indication or load register by means which includes a conventional force transmitter of electronic or pneumatic type.

Another object of this invention is to provide, with a torque rod arranged as above, means to vary or adjust the initial or normal torque of the rod so as to "zero out" the weight-responsive unit prior to any load being placed on the load-receiving platform.

A further object of the invention is to provide a continuous run, automatic weighing machine which is designed for ease and economy of manufacture.

A still further object of the invention is to provide a practical, reliable, and durable continuous run, automatic weighing machine and one which is exceedingly effective for the purpose for which it is designed.

These objects are accomplished by means of such structure and relative arrangement of parts as will fully appear by a perusal of the following specification and claims.

In the drawings:

FIG. 1 is a foreshortened elevation of a continuous run, automatic weighing machine embodying the present invention; the view being partly broken away and partly in section.

FIG. 2 is a cross section taken on line 2—2 of FIG. 1.

FIG. 5 is a view similar to FIG. 1 but illustrates another embodiment of the invention.

FIG. 6 is a cross section on line 6—6 of FIG. 5.

Figure 3:
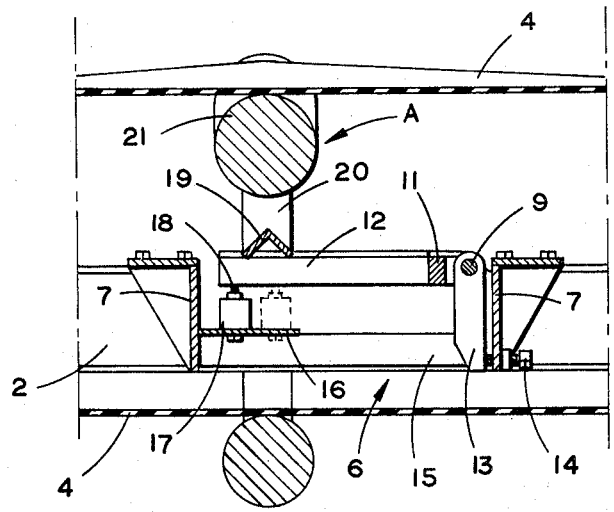
FIG. 3 is a fragmentary longitudinal section taken on line 3—3 of FIG. 2.
Figure 4:
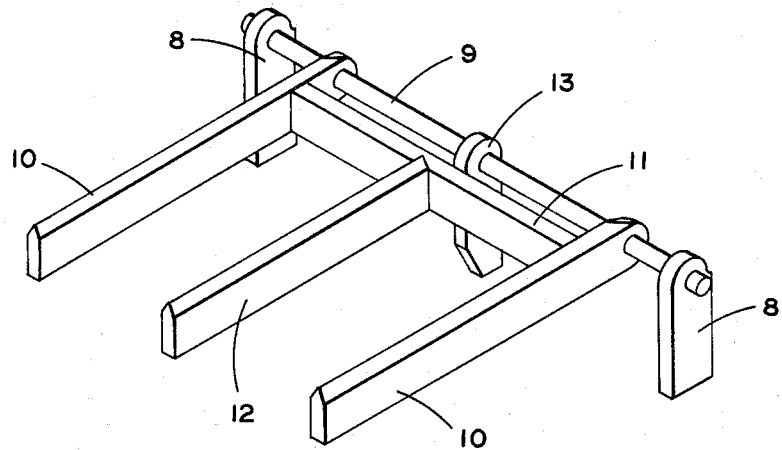
FIG. 4 is a perspective view of the torque rod assembly, detached.

Referring now more particularly to the drawings and to the characters of reference marked thereon, and at present to the embodiment of FIGS. 1–4, the machine comprises a conveyor, indicated generally at 1, which includes longitudinal transversely spaced side frames 2. At their ends, the side frames 2 support wide pulleys 3, one of which is arranged to be driven. Engaging and extending between the pulleys is a wide, endless belt 4 to receive and convey the bulk material to be weighed, and which material is fed onto the receiving end of the upper run of the belt 4 by suitable means such as a hopper 5; the upper run of said belt traveling in the direction indicated by the arrow in FIG. 1.

Supported by the frames 2, intermediate the ends thereof, is the weight-responsive unit of the machine, and which unit, indicated generally at 6, is constructed as follows:

Secured on and extending transversely between the frames 2 in longitudinally spaced relation to each other are rigid angle beams 7 which provide the supports for the unit 6. Attached to the vertical face of the forward one of said beams 7 adjacent the frames 2 are upstanding brackets 8 in the upper ends of which, adjacent the level of the top of frames 2, the ends of a transversely extending torque rod 9 are rigidly secured—in any suitable manner—against rotation. Also rigidly mounted against rotation on the torque rod 9 in spaced relation between the brackets 8 and projecting rearwardly from said rod is a pair of horizontal torque arms 10 which terminate adjacent but short of the rearward beam 7. A transverse tie bar 11 extends between and is rigidly secured to the torque arms 10 a short distance behind the torque rod 9, and a force-transmitting arm 12 is rigidly secured to and projects rearwardly from the tie bar 11 centrally between the torque arms 10.

Directly ahead of the force-transmitting arm 12, or in other words centrally of the length of the torque rod 9, a torsion bracket 13 is rigidly secured to and depends from said rod; an adjustment screw 14 being mounted in the adjacent beam 7 for axial movement relative thereto and engaging the forward face of the torsion bracket 13 adjacent the lower end thereof.

A pair of transversely spaced horizontal bars 15 are secured to and extend longitudinally between the beams 7 adjacent the bottom thereof and on opposite sides of the torsion bracket 13. The bars 15 support a base plate 16 on which is mounted a force transmitter 17 of conventional type and which may be electronic or pneumatic in character. Such force transmitter 17 (also known as a load cell) includes a depressible actuating tip 18 on its upper end, and is disposed on base plate 16 so that the tip 18 is directly below and engaged by the force-transmitting arm 12 adjacent the free end of such arm. Depression of the tip 18 by a load thereon from arm 12, operates the force transmitter 17 and which is connected to and actuates a weight or load indicating or registering instrument (not shown) preferably located at a remote point.

Supported by and upstanding from the arms 10 and 12 is a belt-troughing roller assembly A which engages with the underside of the upper run of the belt 4, so that said belt run—when supporting a load—will exert a downward pressure on said arms. As here shown, the assembly A comprises a rigid cross bar 19 spanning and mounted on the arms 10 and 12 adjacent their free ends, and upstanding bearing brackets 20 at the ends of said bar 19. The brackets 20 together support a plurality of rollers 21 and which rollers are arranged so that the adjacent portion of the upper run of belt 4 assumes a trough-like form as shown at 22 in FIG. 2. It should be noted that the center of the belt-engaging rollers is preferably disposed in a transverse vertical plane slightly to the rear of the central plane of the force transmitter 17 so that the most sensitive action of the latter may be obtained. The force transmitter 17 is, however, arranged for adjustment along the base plate 16 for the purpose later described.

With the torque rod 9 and the various arms mounted as hereinbefore described, it will be obvious that said rod cannot freely rotate in its mounting brackets 8, the arms 10 cannot rotate on the rod 9, and the torsion bracket 13 cannot turn on said rod; such rod being initially positioned or torqued with the force-transmitting arm 12 in a predetermined, substantially "zero" position relative to the force transmitter 17. For an extremely fine "taring" adjustment, the screw 14 is advanced against the torsion bracket 13 so that the torque is increased in the rod 9 in a direction tending to raise the arms 10 and to lift the force-transmitting arm 12 relative to the tip 18 of the force transmitter 17. Thus, the torque load of rod 9 may be varied, by adjustment of the screw 14, so that the weight of the various arms and the assembly A supported thereby will be precisely "zeroed out" and a "no load" reading will be provided at the instrument connected to the force transmitter; this although the tip 18 remains at all times in contact with the arm 12.

When the load to be weighed delivers to and moves with the downwardly yieldable, upper run of belt 4 and the weight of such passing load is transferred to the rollers 21 and thence to the arms 10 and 12 causing a very small downward motion of the latter (and which motion the torque rod permits), the tip 18 of the force transmitter 17 is correspondingly depressed and the weight of said passing load is thus continuously and accurately indicated or registered by the aforesaid connected instrument.

It will be noted that in all cases the weight of the passing load is reflected by the downward movement of the force-transmitting arm 12, turning in effect about the axis of the torque rod 9. Since the actual amount of said downward movement of the arm 12 decreases from the free end of the arm toward the forward or connected end thereof, it will be obvious that by adjusting the force transmitter 17 along the base plate 16, a large range of weight recording capabilities is possible.

While the torque rod 9 has been shown in the drawings as being solid, said rod may also be made in tubular form and in any event is preferably made of stainless steel.

In the embodiment of FIGS. 5 and 6, the weight-responsive unit, indicated generally at 23, is shown as modified to accommodate said unit to an endless belt conveyor 24 whose upper run 25—between pulleys 26— is flat both longitudinally and transversely; said upper run being fed from a hopper 27. In general, the weight-responsive unit 23 is quite similar to the embodiment of FIGS. 1-4, and includes longitudinally spaced cross beams 28 extending between the sides of the conveyor frame, transversely spaced brackets 29 secured to the forward beam 28, a torque rod 30 non-rotatably secured to and spanning between said brackets, transversely spaced torque arms 31 (although here shorter) fixed on and projecting rearwardly from the torque rod, and horizontal bars 32 connected between the beams 28 in supporting relation to a base plate 33 for the force transmitter 34. Also, the torque rod 30 is adjustable—as before—by means of a torsion bracket 35 against which an adjustment screw 36 abuts.

However, in the embodiment of FIGS. 5 and 6 the belt-troughing roller assembly A of FIGS. 1-4 is omitted as is the force-transmitting arm 12, and in lieu thereof a flat, force-transmitting plate 37 is secured on torque arms 31 and projects rearwardly from the torque rod 30 in engagement with the underside of the flat upper run 25 of the endless belt conveyor 24.

Further, the bars 32 and base plate 33 are positioned so that the underside of the force-transmitting plate 37 engages the depressible tip 38 of the force transmitter 34.

Thus, when said upper run 25 is loaded and slightly yields downwardly with corresponding motion of plate 37, such motion is transmitted to and correspondingly depresses the tip 38 of the force transmitter 34 with the same result and for the same purpose previously described in connection with the embodiment of FIGS. 1-4.

From the foregoing description, it will be readily seen that there has been produced such a continuous run, automatic weighing machine as substantially fulfills the objects of the invention, as set forth herein.

While this specification sets forth in detail the present and preferred construction of the continuous run, automatic weighing machine, still in practice such deviations from such detail may be reosrted to as do not form a departure from the spirit of the invention, as defined by the appended claims.

Having thus described the invention, the following is claimed as new and useful and upon which Letters Patent is desired:

1. In a weighing machine which includes a downwardly yieldable load-receiving platform, a horizontal torque rod, means mounting the rod against rotation, a torque arm rigid with and projecting from the torque rod below the load-receiving platform, a platform-engaging structure supported by the torque arm whereby said arm is slightly but correspondingly lowered when the platform is loaded, and means including a force transmitter actuated upon such lowering of the arm.

2. A machine, as in claim 1, with means to adjust the rod to increase the torque therein whereby to effect taring adjustment of the arm and platform-engaging structure.

3. A machine, as in claim 2, in which said adjustment means comprises a torsion bracket rigid with and projecting from the rod, and an adjustable screw mounted in a fixed position and disposed to be advanced against the bracket.

4. A machine, as in claim 1, in which said means includes a force-transmitting arm rigid with and projecting from the torque rod generally lengthwise of the torque arm, and a base member mounted in a fixed position below the force-transmitting arm and on which member the force transmitter is mounted; said force transmitter including an actuating tip engaged and adapted to be depressed by said force-transmitting arm.

5. A machine, as in claim 4, in which the force transmitter is adjustable along the base member in a direction lengthwise of the force-transmitting arm.

6. In a weighing machine which includes a driven endless belt whose upper run provides a downwardly yieldable load-receiving platform, a horizontal torque rod below said upper run of the belt intermediate the ends and extending transversely thereof, means mounting the rod adjacent its ends against rotation, transversely spaced torque arms projecting substantially horizontally and radially from the rod intermediate its ends and rigid therewith, means including a force transmitter actuated upon downward movement of the torque arms, and a structure supported by the torque arms and engaging the underside of said upper run of the belt whereby the torque arms are moved downward when such upper run is loaded.

7. A machine, as in claim 6, in which said last named means comprises a force-transmitting arm projecting substantially horizontally and radially from the torque rod and rigid therewith, said force-transmitting arm being disposed between the torque arms and extending in the same direction, and a base member secured in a fixed position below the free end portion of the force-transmitting arm; the force transmitter being mounted on said base member and including an actuating tip engaged and adapted to be depressed by said free end portion of the force-transmitting arm.

8. In a weighing machine which includes a downwardly yieldable load-receiving platform, a horizontal torque rod, means mounting the rod against rotation, a structure secured in connection with the torque rod and projecting therefrom below but having engagement with the platform, said platform-engaging structure being slightly but correspondingly lowered when the platform is loaded and yields downwardly, and means including a force transmitter actuated upon such lowering of said platform-engaging structure.

9. A machine, as in claim 8, for use with an endless conveyor having a flat upper run which comprises said load-receiving platform; the platform-engaging structure including a flat plate fixed on and projecting from the torque rod in face-to-face contact with the underside of said upper run, and the force transmitter including a depressible element in engagement with the underside of such plate.

References Cited
UNITED STATES PATENTS

| | | |
|---|---|---|
| 3,141,516 | 7/1964 | Moring. |
| 3,163,248 | 12/1964 | Farquhar _____ 177—16 X |
| 3,331,457 | 7/1967 | Blubaugh _____ 177—16 |
| 3,339,650 | 9/1967 | Carr _____ 177—16 |

RICHARD B. WILKINSON, *Primary Examiner.*

GEORGE H. MILLER, JR., *Assistant Examiner.*